Patented Apr. 4, 1939

2,152,633

UNITED STATES PATENT OFFICE 2,152,633

DRYING OIL COMPOSITIONS

William R. Catlow, Jr., and Harold F. Wakefield, Bloomfield, N. J., assignors to Bakelite Corporation, New York, N. Y., a corporation of Delaware No Drawing. Application April 25, 1936,
Serial No. 76,394

10 Claims. (Cl. 134—26)

This invention relates to compositions of the drying oil type and to their preparation. The invention provides compositions of the drying oil type primarily intended for priming compositions, and the disclosure which follows is presented largely with that application in view.

An ideal primer is one that when applied as a coating, dries in air with the rapidity of a spirit solution merely by evaporation of solvent and without substantial retention of solvent; also it deposits an adherent film that is somewhat pervious to provide good anchorage for a succeeding coat yet it is resistant to a subsequent solvent action of a superposed coating such as a cellulose ester lacquer. Priming compositions as made with drying oils, however, depend as a rule upon oxidation by the air to solidify the deposited films; but even with relatively small proportions of drying oil content (about equal parts by weight of oil and resin) the drying period of such compositions may be one of several hours or more, and this is too long to satisfy practical demands. A substantial shortening of this period can be had by including relatively large quantities of oxidation-accelerating agents; but a disadvantage in the use of these agents lies in the fact that, while a film may be oxidized thereby to a solvent-resistant surface glaze, it undergoes dimensional changes causing a considerable tension that, when released by a slight softening of the surface through solvents contained in succeeding coats, result in a tendency of the primer to crack or blister or lift from the surface being coated; a glazed surface furthermore affords poor anchorage for succeeding coats.

Not only should a primer when applied dry rapidly to an inert, solvent-resistant and adherent coating but the coating should not materially change upon aging. It is common practice for manufacturers to coat parts with primers for protection against corrosion and then store the coated parts until there is occasion to finish them; this is particularly true in the automobile and airplane industries. Drying oil compositions, as commonly prepared, deteriorate upon standing on account of the continued oxidation which takes place as long as there is unreacted material exposed to the action of air. The deterioration results in poor adherence, loss of flexibility and eventually in actual breakdown of a primer coat.

The present invention provides stabilized drying oil compositions which, when applied as coatings and exposed to air, harden directly upon evaporation of the volatile solvent content into homogeneous films that can be had sufficiently inert to the oxidizing action of air so that they do not change materially during storage. Furthermore, coatings are obtainable which are characterized by insolubility in and exceptional resistance to solvents found in cellulose ester or alkyd resin lacquers commonly used at the present time for finish coatings and also to other organic solvents such as gasoline, mineral spirits, benzol, toluol, acetone, alkyl acetates, turpentine, etc. The compositions are accordingly peculiarly useful as undercoatings or primers, possessing as they do the rapidity of drying in a period measured by minutes, and, on account of the drying oil content, the flexibility, adherence, etc. of drying oil compositions.

Briefly stated, the present invention comprises a conversion or advancement of drying oil compositions which also contain resins to a condition of substantial chemical inertness and non-solubility prior to their application as coatings on surfaces.

A method of accomplishing a conversion or advancement of a composition of a drying oil and a resin is that of heating together the drying oil and the resin, for heating imparts to such a composition an increasing insolubility in solvents. To obtain by heating the desired properties of non-solubility and quick drying, however, it becomes necessary to heat at temperatures or for times which will advance them to a state of insolubility that normally renders them unsuitable for the preparation of useful coating compositions, since they become tough, rubbery, elastic, substantially infusible solids which are non-disperisble in the ordinary hydrocarbon solvents and which do not readily sinter or soften under the action of heat or solvents.

According to the present invention there is included in an oil-resin composition, in conjunction with its advancement by heating and prior to the heating thereof or prior to any substantial amount of gel formation, a metallic oxide such as zinc oxide; unexpected and profound changes in the properties of the resulting composition are obtained as a result. To illustrate the changes caused by the addition of a metal oxide the following comparative data, based on a measurement of insolubility in acetone, are included. (The extent to which the composition has been advanced or converted can be measured by Soxhlet extraction with a solvent, such as acetone which is commonly used and is the most convenient for purposes of test; in other words the proportion of material non-extractable by acetone is a definite measure of the degree of advancement or conversion of the oil-resin composition, though heretofore it has been considered impossible to prepare useful coating compositions from oil-resin compositions which have a non-extractability by acetone greater than 15% to 30%.) A mixture, for example, consisting of 53 parts by weight of tung oil, 3 parts by weight of castor oil and 29 parts by weight of an oil-soluble synthetic resin of the phenol-formaldehyde type is heated at 250° C. for 30 minutes and yields a composition which is non-extractable by acetone to the extent of 50–55% but which is practically non-dispersible in hydrocarbons and consequently not usable as a coating composition or binder; a composition obtained at the end of one hour heating is non-extractable by acetone to the extent of 65% and completely non-dispersible in hydrocarbon thinners; and a composition obtained as a result of 2 hours heating is non-extractable by acetone to the extent of 75% and completely non-dispersible in hydrocarbon thinners. In contrast, an oil-resin mixture identical to that described above has added thereto 15 parts of zinc oxide and then heat is applied as before; there is obtained after a heat treatment of 30 minutes at 250° C., a composition which is non-extractable by acetone to the extent of 55% but which is, however, completely dispersible in a hydrocarbon solvent such as toluol; when the heating is prolonged to one hour, a composition is obtained which is non-extractable by acetone to the extent of 75–80% but it is still dispersed readily in toluol, xylol, or other hydrocarbon thinners; and when the heat treatment is prolonged to 2½ hours the non-extractability by acetone of the composition is increased to an extent of 85–90% but the dispersibility in hydrocarbon thinners is found to remain substantially unchanged. Each of these compositions containing a metal oxide and in the dispersed form are useful as coating compositions; the dispersion of the composition obtained by heating for one hour does not deteriorate on storage, and it deposits a film or coating which air dries in three to five minutes to provide a surface that is solvent-resistant and to which a succeeding coat can be applied without lifting, blistering, or cracking; the film deposited from a dispersion of the composition heated for 2½ hours is somewhat more solvent-resistant and dries more rapidly than that of the oil-resin-oxide composition which has been advanced by an hour's heat treatment only. Physically the above compositions obtained as a result of the introduction of the zinc oxide with a heat treatment of about thirty minutes are soft, plastic solids, while those obtained with a heat treatment of one or two hours are hard, brittle, resin-like solids which sinter at temperatures of about 60–100° C.; all are readily dispersible in benzol, toluol, hydrogenated petroleum, and similar agents and all the dispersions deposit continuous, smooth, coalescent and resistant films.

Oils other than those employed in the above illustration give satisfactorily converted oil-resin compositions when the heat treatment is carried out in the presence of a metallic oxide. Such oils include linseed, oiticica, soya bean, fish, perilla, sunflower, poppy seed and other drying or semi-drying fatty oils. Non-drying oils, such as rape, cotton seed, corn, etc., may be included at least in part and generally any compatible plasticizing agent as the alkyl and aryl phosphates and phthalates. The preferred compositions for coatings are those containing as the oil a major portion of tung oil.

For the resin component a most suitable one is found to be an oil-soluble resin of the phenol-formaldehyde type, particularly one which does not require modification by rosin or other natural resin to render it soluble in a drying oil. Such a resin can be prepared as is known by reacting an alkyl- or aryl-substituted phenol, as butyl phenol or phenyl phenol, with formaldehyde in the proper proportions and in the presence of either an alkaline or an acid condensing agent.

A phenol-formaldehyde resin modified by rosin or a natural resin to make it oil-soluble can be used, but the converted oil-resin-oxide composition obtained in such a case is inferior in integrity to a composition prepared from an unmodified phenol-formaldehyde resin. It is also possible to use as a substitute, in whole or in part, rosin and its salts or esters, such as limed rosin, ester gum, etc., as the resin component; the converted composition obtained with such a substitute can be dispersed in hydrocarbon thinners, and the dispersion deposits a film which is superior to the ordinary rosin and drying oil varnish film.

Widely varying proportions of oil and resin can be used, but other conditions, such as the solvent resistance of the film, drying time, flexibility, etc., dictate the upper limiting ratio of resin to oil to be about 60 parts resin to 40 parts of oil. The maximum solvent resistance combined with quick drying and flexibility is apparently obtained when using a ratio approximating 30 parts of resin to 70 parts of oil.

Zinc oxide is the preferred oxide for rendering a heat-converted oil and resin composition dispersible in hydrocarbon thinners. The proportion required is dependent on the particular composition, the particular oil or oil-resin mixture and the relative proportions of resin to oil. In general, the minimum quantity of zinc oxide to be used is about 3–3.5 parts of zinc oxide to 40 parts of oil, or about 7% of zinc oxide based on the weight of oil. In place of zinc oxide can be used the oxides of lead, magnesium, calcium; the hydroxides, naphthenates, tungates, etc. of these metals including zinc, other metallic soaps, carbon black, etc. The oxides and hydroxides can be substituted in about equivalent proportions for zinc oxide to secure like results; but as to the other materials the proportions vary widely, carbon black, for example, being used in amounts several times (about 3–4 times) that of zinc oxide.

For applying the converted oil-resin compositions as coatings, their dispersions in hydrocarbon thinners such as toluol, xylol, benzol, hydrogenated petroleum, etc. are employed. The dispersions are readily obtained merely by adding the compositions to thinners at room temperature, or thinners can be incorporated in the compositions; solid compositions are preferably coarsely ground or broken up before they are added to thinners. The particle size of the converted oil-resin composition in such dispersions usually does not exceed two microns. If the concentration of the dispersed oil-resin composition is not less than 50% such dispersions will remain completely stable and show no substantial separation on aging; and if the concentration is less than 50%, some particle separation may occur, but this in no way impairs the usefulness of the material as a coating composition. The dispersions possess the characteristics of low viscosity, high percentage of solid flow, and leveling to make them useful coating compositions; they can be applied by spraying, dipping or brushing, and they dry rapidly (in about 3 to 5 minutes when highly volatile thinners are used) to give films that are resistant to solvents and particularly to solvents found in cellulose ester lacquers. Solvents or thinners readily escape from them and there is substantially no tendency on the part of the converted oil-resin compositions during drying to retard evaporation of volatiles with its consequent shrinkage of deposited films. The films are practically inert to the oxidizing action of the air; consequently they are not materially altered during storage. The surfaces provided by such films have no apparent tendency to lift, blister or crack when succeeding coats are applied.

Another method can be followed in preparing dispersions of converted oil-resin compositions and it is one that can be used either as a substitute for or in conjunction with the foregoing method employing heat together with metallic oxide or their equivalents for the advancement of oil-resin compositions. A suitable oil varnish, such for example as prepared by heating an oil-soluble phenol-formaldehyde resin with tung oil in the foregoing proportions, is dispersed as an emulsion in water or other non-solvent liquid; then air or ozone is blown through the emulsion whereby the finely dispersed particles become individually oxidized. The degree of acetone-insolubility is controlled by the extent of oxidation, similarly to the foregoing method of heat treatment. This method avoids the necessary addition of a metal oxide and heating. The resulting dispersion can be used as a coating composition to deposit a film of an oil-resin composition in a state of only sparing solubility in acetone and substantial non-solubility in those solvents commonly used in the preparation of cellulose ester lacquers. The film air-dries readily in 3 to 5 minutes. While not quite as resistant to cellulose ester lacquer solvents as a film deposited by a resin-oil composition that is heat-advanced in the presence of a metal oxide, it is superior to ordinary air-drying oil varnishes. In place of blowing with air, an oxidizing agent can be substituted such as benzoyl peroxide, hydrogen peroxide, etc., and after the desired oxidation has been obtained it can be checked by adding an oxidation inhibitor such as quinol, p-hydroxy phenyl morpholine, naphthol, di-beta naphthyl, para phenylene diamine, etc. For maintaining a dispersion of an oxidation-advanced oil-resin composition, a stabilizing agent can be included, such as methanol amine, bentonite, ammonium linoleate, gelatine, tannic acid, starch, gum arabic, casein solution, soaps, etc., or similar agents that normally function as stabilizing agents for dispersions of a varnish in a water type of emulsion.

Common to both methods of obtaining a substantially inert and acetone-insoluble composition that is yet readily dispersible in thinners to form coating compositions that yield rapid-drying homogeneous films is the inclusion of an agent which apparently controls or directs the advancement of the composition. In the heat-advanced method the metal oxide performs this function, while in the oxidized-advanced method the dispersion medium or non-solvent liquid accomplishes the result. An explanation of this control action may be that the agent acts as a retardant for gelation, thus permitting gelation by heating or oxidizing to proceed to a point that further heating or exposure of the film to oxidizing conditions is rendered unnecessary and yet preventing gelation to proceed beyond the point at which the material can be dispersed readily.

The two methods can be combined if desired; for example, the heat-advanced oil-resin composition can be dispersed as an emulsion and then further advanced by oxidation. Such a combination of methods produces a coating composition which deposits a film more solvent-resistant than one obtained by the use of the oxidation method alone.

Fillers, pigments, dyes, etc. can be incorporated with these advanced oil-resin compositions or with their dispersions to give highly satisfactory paints and enamels; it is also possible to mix them with other oil or oil-resin compositions. Mixing is best done by preliminarily passing the advanced oil-resin dispersion through a colloid mill, as when so processed it is found to mix more readily and with a greater variety of paints, enamels, varnishes and japans than is otherwise the case. Such processing also is desirable when no mixing is intended as it results in a decreased drying time, improves the gloss, and promotes more even hardening throughout the film to thereby further decrease the tendency to dimensional change during the drying of the film.

While dispersions of these advanced oil-resin compositions have proven particularly suitable for use as priming coats on metal, wood, and the like, they can also be used to coat paper, cloth, parchment, leather, etc. They have also proven valuable in the coating of porous surfaces such as plaster, wall board, adobe, concrete, papier-mâché, etc., since they deposit a stable, rapid drying film resistant to solvent and water and thus provide an effective "sealer" coat on the surface of porous materials. The converted or advanced oil-resin compositions with or without thinners can be admixed with other oils, resins or varnishes, and when so blended accelerate the drying and hardening of the latter sometimes as much as 30 to 50% or more; this is especially true when added to alkyd resin coating compositions and the like which ordinarily remain tacky for 6 to 8 hours, and their hardening time can be shortened to as little as ½ hour by the addition of 50% of an advanced composition of an oil and oil-soluble phenol resin as herein described. The converted compositions or their dispersions can also be applied to surfaces of asphalt, wax, halogenated naphthalene wax or the like, and when so applied provide a sealing coat which prevents bleeding from an asphalt or wax surface into any lacquer or varnish coat that may be applied subsequently; this has proven effective in the coating of wire which is first given a wax coating, then a coating of an advanced oil-resin dispersion and then a lacquer or varnish.

For a better understanding of the invention the following examples are given, but it is to be understood that they are merely illustrative and do not restrict the invention to the specific ingredients or porportions set out.

*Example 1.*—About 26.5 parts by weight of tung oil, about 1.5 parts by weight of castor oil and approximately 7.5 parts by weight of zinc oxide are heated to about 250° C. in about one hour; approximately 14.5 parts by weight of synthetic resin, such as that obtained by reacting about 100 parts by weight of p-hydroxydiphenyl and about 75 parts by weight of formaldehyde (40% solution) in the presence of an acid catalyst, are added over a 15 minute period during which the mixture is agitated. The mixture is maintained at about 250° C. for about 1½ to 2½ hours or until the desired viscosity has been attained, after which it is dispersed in an equal weight of toluene or xylene; it is preferred to prepare the dispersion by slightly cooling the varnish mixture, say to about 100—150° C., introducing it into a kettle fitted with a reflux condenser and then flowing in the solvent. The dispersion, when thinned with an equal weight of toluol or xylol has a viscosity of about 500 k. v. at 25° C. A rapid drying coating composition can be prepared by mixing together, preferably in a ball mill, about 45 parts by weight of the 50 per cent dispersion further thinned with about 27.5 parts by weight of toluene or xylene, approximately 27.5 parts by weight of pigment such as zinc chromate, and about 12 parts by weight of plasticizing agent such as a mixture containing equal parts of castor oil and dibutyl phthalate; if desirable the mixture can be further thinned with toluene or xylene.

A coating produced by this composition is highly resistant to action of solvents, particularly those contained in the cellulose ester lacquers; and it does not deteriorate upon aging but retains its flexibility, adherence and solvent resistance over long periods of time, thus making it possible to store parts coated with this primer composition almost indefinitely before application of the finishing coats without detrimental results. If desirable, however, articles can be recoated in 3–5 minutes after application of the initial coating.

*Example 2.*—About 29.6 parts by weight of tung oil, approximately 1.6 parts by weight of castor oil and about 2.8 parts by weight of zinc oxide are heated to about 250° C., over a period of one hour and mixed with approximately 16 parts by weight of a synthetic resin such as that obtained by reacting about 100 parts by weight of p-hydroxydiphenyl and about 75 parts by weight of formaldehyde (40% solution) in the presence of an acid catalyst. After being maintained at about 250° C. for approximately 4 hours, the mixture is cooled to about 150° C. and dispersed in an equal weight of toluene or xylene. Preferably the dispersion is prepared in a manner analogous to that described in Example 1.

A so-called sealer coating composition can be prepared by mixing preferably in a ball mill, about 47.5 parts by weight of the above dispersion with about 17.5 parts by weight of thinner such as toluene and approximately 35 parts by weight of a pigment such as a mixture containing equal quantities of talc and silica. This material is suitable for sealing the pores of wood providing a hard, smooth, resilient, solvent-resistant coating which can be sanded and re-coated after a short drying period, say 10 minutes.

*Example 3.*—About 1 part by weight of phenol and about 3 parts by weight of tung oil are digested in the presence of an acid catalyst, and the product is reacted with about 0.2 part by weight of hexamethylene-tetramine or equivalent. About 16 parts by weight of this composition when added to about 74 parts by weight of a dispersion obtained as in Example 1 and maintained at approximately 130° C. for about 2 hours, produces a composition which, after being mixed with suitable quantities of thinner such as about 10 parts by weight of methanol, is particularly suitable for use in the preparation of rapid drying enamels with the addition of pigment to yield coatings characterized by high gloss and great solvent resistance. The flexibility of these films is somewhat greater than that of the materials described in the preceding examples.

*Example 4.*—About 85 parts by weight of raw linseed oil and about 15 parts by weight of a synthetic resin such as that obtained by reacting about 100 parts by weight of phenyl substituted phenol and about 75 parts by weight of formaldehyde (40% solution) in the presence of an acid catalyst, are heated to about 300° C. and about 15 parts by weight of zinc oxide are added. After maintaining the mixture at about 300° C. for approximately 2½ hours, it is cooled to about 150° C. and dispersed in an equal volume of toluene or xylene. Preferably the dispersion is prepared in a manner analogous to that used in Example 1.

A rapid drying non-yellowing white enamel yielding coatings characterized by hardness, resistance to solvent action and high gloss can be prepared by mixing the above varnish with a suitable pigment. For example 8 parts by weight of a varnish such as described above are mixed with about 6 parts by weight of a milled paste comprising of about 68% by weight titanium dioxide, 15% by weight of petroleum thinner and 17% by weight of highly bodied linseed oil. This enamel with the added oil content dries to a hard non-tacky surface in about one hour without addition of the usual siccative agents.

*Example 5.*—About 1 part by weight of phenol and about 3 parts by weight of tung oil are digested in the presence of an acid catalyst, then mixed with about 5% by weight of zinc oxide and about 5% by weight of hexamethylenetramine both based on the weight of oil and resin used), and the mixture heated at 100° to 110° C. until a rubber-like highly viscous gel is obtained; the gel is kneaded with quantities of a thinner until a heavy dispersion is obtained, preferably having a nonvolatile content of about 50% by weight, which can just barely be poured at room temperature. A second composition is prepared by mixing about 53 parts by weight of tung oil, about 3 parts by weight of castor oil and approximately 15 parts by weight of zinc oxide, heating to about 250° C. and slowly adding about 29 parts by weight of a synthetic resin such as that obtained by reacting about 100 parts by weight of p-hydroxydiphenyl and about 75 parts by weight of formaldehyde (40% solution) in the presence of an acid catalyst; the temperature of the mixture is maintained at about 250° C. until the desired viscosity has been acquired (for example, about 125 k. v. at 25° C. when thinned with toluol to a non-volatile content of 25% by weight) and then it is thinned with toluene to produce a dispersion having a non-volatile content of about 50% by weight; preferably the dispersion is prepared by slightly cooling the mixture, say to about 150–200° C., then mixing it with thinner in a kettle equipped with a reflux condenser in order to prevent undue loss of thinner. A composition obtained by mixing about 18 parts by weight of the first composition with about 82 parts by weight of the second composition is preferably homogenized by passing the mass through so-called paint rolls; and after being mixed with appropriate quantities of thinner such as about 10 per cent by weight of methanol, the material is suitable for use in the preparation of rapid drying enamels.

A rapid drying enamel utilizing the above described varnish as a base can be prepared by mixing about 16.8 parts by weight of varnish and 12.6 parts by weight of a pigment; a suitable pigment can be prepared by milling together about 4.1 parts by weight of titanium dioxide, 1.1 parts by weight of highly bodied linseed oil and .8 part by weight of petroleum distillate thinner. In addition to drying rapidly, the enamel is further characterized by producing a film having great resistance to solvent action, high gloss, hardness and substantial freedom from yellowing tendencies upon aging.

*Example 6.*—About 265 parts by weight of tung oil, about 15 parts by weight castor oil and about 58 parts by weight of zinc hexahydrobenzoate or equivalent are mixed and heated to about 250° C. in about one hour; there is added approximately 145 parts by weight of an oil soluble resin such as is obtained by reacting about 100 parts by weight of paratertiary amyl phenol and about 50 parts by weight of formaldehyde (40% solution) in the presence of an acid catalyst, and the mixture is maintained at approximately 250° C. for about 3 hours. After cooling, the material can be dispersed in about 483 parts of toluol or xylol and preferably the dispersion is prepared in a manner analogous to that described in Example 1, giving a material having a viscosity of about 10,000 k. v. at 25° C.

This material is somewhat slower drying than the heat-advanced composition described in Example 1 but is characterized by extreme flexibility, toughness and comparatively higher gloss.

*Example 7.*—A mixture comprising about 100 parts by weight of a synthetic resin obtained by reacting about 100 parts by weight of p-hydroxydiphenyl with about 75 parts by weight of formaldehyde (40% solution) in the presence of an acid catalyst, and about 200 parts by weight of tung oil is heated at about 200° C. for approximately one hour; if desired in order to accelerate the rate of drying of the product, small quantities of siccative agents can be added to the mixture at this point, for example about 1.07 parts by weight based on the amount of oil used of lead resinate and about 0.71 part of manganese resinate or equivalent. An emulsion can be prepared by pouring about 300 parts by weight of the hot liquid mixture into about 112 parts by weight of water at about 85° C. containing about 10 parts by weight of casein and 12 parts of ammonia (calculated as 29% $NH_3$) or equivalent emulsifying agent; preferably, the hot varnish is slowly added to the water during violent agitation, which causes the varnish to become the dispersed phase. he emulsion can be advanced to a dispersion of a finely divided gel, i. e. bodied or oxidized either by blowing air or similar oxidizing gas through the mixture, or by substituting hydrogen peroxide solution for a portion of the dispersing phase in the emulsion. In the method of bodying with air, the air is blown through the mixture at room temperature for about five hours or the mixture is sprayed in an oxidizing atmosphere; in the hydrogen peroxide method, which is somewhat more rapid than the air-blown method, about 50 parts by weight of the emulsion are mixed with about 20 parts by weight of a solution of hydrogen peroxide (3% $H_2O_2$ by weight) and after being slowly heated to boiling, the mixture is boiled for about ten minutes.

The dispersion obtained by either of the above processes when applied to a surface, deposits a film which rapidly dries to a non-tacky state, usually in about five minutes, and is substantially unaffected by most organic solvents including acetone and cellulose ester lacquers.

What is claimed is:

1. Process of preparing an oil-resin composition dispersible in a liquid medium to form a coating composition drying substantially by evaporation of liquid medium which comprises advancing a composition of a fatty oil and an oil-soluble resin of the phenol-aldehyde type to a condition of non-extractability in acetone approximating thirty per cent or more in the presence of a control agent capable of maintaining dispersibility in a liquid medium of the composition in the advanced condition.

2. Process of preparing an oil-resin composition dispersible in a liquid medium to form a coating composition drying substantially by evaporation of liquid medium which comprises advancing a composition of a fatty oil and an oil-soluble resin of the phenol-aldehyde type to a condition of non-extractability in acetone approximating thirty per cent or more in the presence of a control agent capable of maintaining dispersibility in a liquid medium of the composition in the advanced condition, said control agent being selected from the group consisting of oxides, hydroxides, naphthenates and tungates of zinc, lead, magnesium and calcium and carbon black.

3. Process of preparing an oil-resin composition dispersible in a liquid medium to form a coating composition drying substantially by evaporation of liquid medium which comprises advancing a composition of a fatty oil and an oil-soluble resin of the phenol-aldehyde type to a condition of non-extractability in acetone approximating thirty per cent or more in the presence of a control agent capable of maintaining dispersibility in a liquid medium of the composition in the advanced condition, said control agent being selected from the group consisting of oxides, hydroxides, naphthenates and tungates of zinc, lead, magnesium and calcium and carbon black and constituting not less than seven per cent based on the weight of the oil.

4. Process of preparing an oil-resin composition dispersed in a liquid medium to form a coating composition drying substantially by evaporation of liquid medium which comprises dispersing a composition of a fatty oil and an oil-soluble resin of the phenol-aldehyde type in a liquid medium, and subjecting the dispersed composition to advancement in the liquid medium until a condition is reached of non-extractability in acetone approximating thirty per cent or more.

5. Process of preparing an oil-resin composition dispersed in a liquid medium to form a coating composition drying substantially by evaporation of the liquid medium, which comprises dispersing a composition of a fatty oil and an oil-soluble resin of the phenol-aldehyde type in a liquid medium, and subjecting the dispersed composition to oxidation in the liquid medium until a condition is reached of non-extractability in acetone approximating thirty per cent or more.

6. Composition, suitable for use in coating compositions drying substantially by evaporation, comprising a fatty oil and an oil-soluble resin of the phenol-aldehyde type, said composition being in a condition of advancement characterized by a non-extractability in acetone approximating thirty per cent or more and by dispersibility in a liquid medium.

7. Composition, suitable for use in coating compositions drying substantially by evaporation, comprising a fatty oil, an oil-soluble resin of the phenol-aldehyde type and an agent selected from the group consisting of oxides, hydroxides, naphthenates and tungates of zinc, lead, magnesium and calcium and carbon black, said composition being in a condition of advancement characterized by a non-extractability in acetone approximating thirty per cent or more and by dispersibility in a liquid medium.

8. Composition, suitable for use in coating compositions drying substantially by evaporation, comprising a fatty oil and an oil-soluble resin of the phenol-aldehyde type, said composition being in a condition of advancement characterized by a non-extractability in acetone approximating thirty per cent or more and by dispersibility in a liquid medium and having in admixture therewith a resin of the alkyd type.

9. Composition, suitable for use in coatings drying substantially by evaporation, comprising in dispersion a fatty oil and an oil-soluble resin of the phenol-aldehyde type, said composition being in a condition of advancement characterized by a non-extractability in acetone approximating thirty per cent or more.

10. Composition, suitable for use in coatings drying substantially by evaporation, comprising a fatty oil and oil-soluble resin of the phenol-aldehyde type dispersed in a liquid medium, said composition being in a condition of advancement through oxidation characterized by a non-extractability in acetone approximating thirty per cent or more.

WILLIAM R. CATLOW, Jr.
HAROLD F. WAKEFIELD.